Jan. 17, 1961
C. F. BACHLE
2,968,294
AIR INTAKE MANIFOLD STRUCTURE
Filed Dec. 22, 1955
2 Sheets-Sheet 2
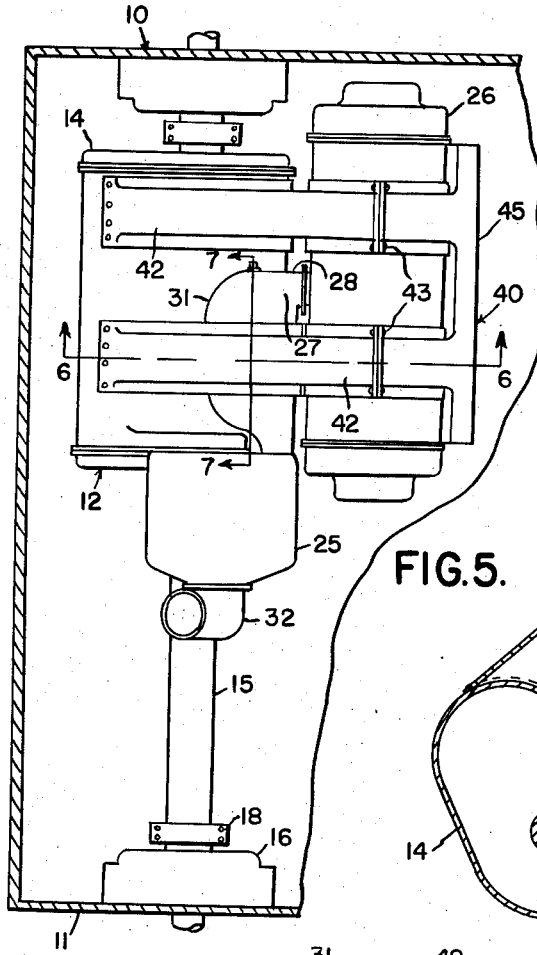
FIG.5.
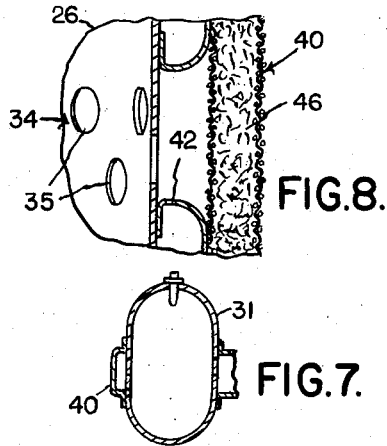
FIG.8.
FIG.7.
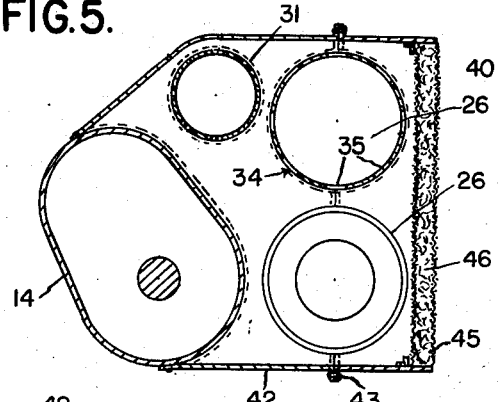
FIG.6.
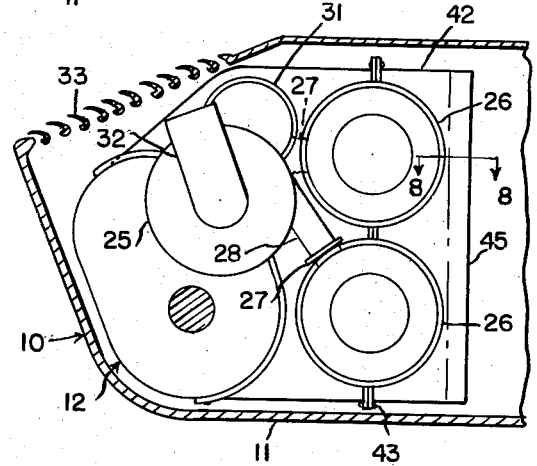
FIG.4.
INVENTOR.
CARL F. BACHLE
ATTORNEYS United States Patent Office 2,968,294
Patented Jan. 17, 1961

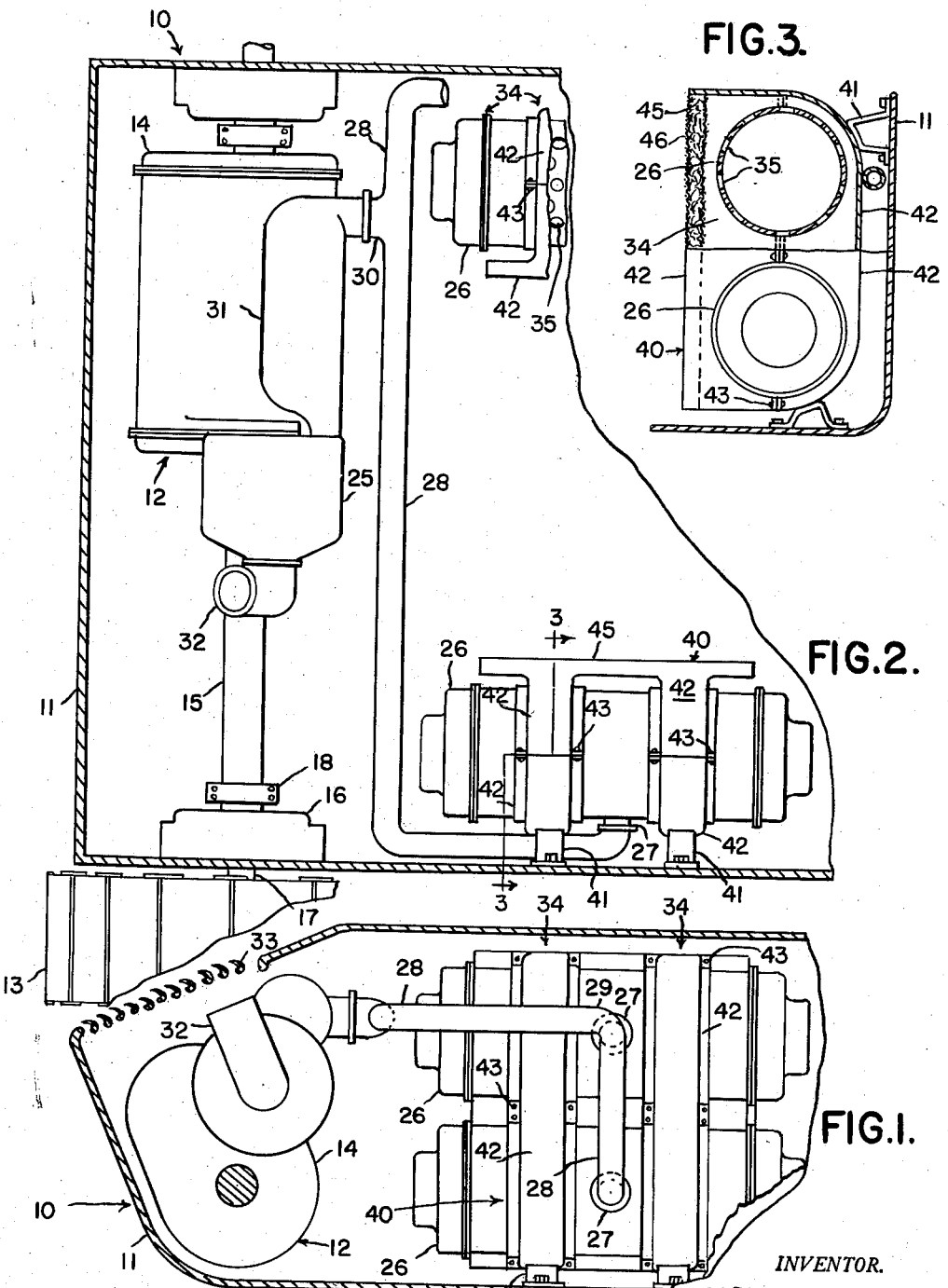

2,968,294

AIR INTAKE MANIFOLD STRUCTURE

Carl F. Bachle, Grosse Pointe, Mich., assignor to Continental Aviation and Engineering Corporation, Detroit, Mich., a corporation of Virginia Filed Dec. 22, 1955, Ser. No. 554,786

7 Claims. (Cl. 123—46)

This invention relates to power plant construction for vehicles, such as tanks and the like, and more particularly to compact, integrated air intake manifold and air cleaner constructions for power plants comprising a gas generator and gas turbine construction.

The overall development of power plants for heavy vehicles such as tanks and other heavy equipment is directed toward simplicity of construction and efficient utilization of available space with no loss of operating efficiency. Present developments are geared to the combination of a gas producer such as a free piston engine supplying gas pressure for the operation of a gas turbine, which is suitably adapted to drive the vehicle transmission. Generally, more than one free piston engine is used, and these are located in the most convenient space available, depending on the type of vehicle. A major source of trouble, however, is the placement and installation of the air cleaners and the air intake ducts supplying air to the engine air induction systems.

An object of this invention, therefore, is to simplify overall power plant construction by eliminating all air intake ducts and utilizing a compact air intake manifold structure having integral air cleaners and adapted to enclose the air induction systems of the free piston engines.

Another object of the invention is to facilitate assembly and installation of the aforesaid power plant components by providing an air intake manifold structure supported by the vehicle frame and serving as the basic supporting structure for the engines themselves, thereby eliminating additional structural supports as well as ducting.

For a more detailed understanding of the invention, reference may be had to the accompanying drawings illustrating typical preferred embodiments of the invention in which like reference characters are referred to like parts throughout the several views and in which—

Fig. 1 is a side elevational view of a power plant in the rear section of a typical vehicle, Fig. 2 is a top plan view of the power plant components indicating one arrangement thereof, Fig. 3 is a section substantially on line 3—3 of Fig. 2, Fig. 4 is a side elevational view of a different power plant arrangement installed in a vehicle rear section, Fig. 5 is a top plan view of the arrangement of Fig. 4.

Fig. 6 is a diagrammatic section on the line 6—6 of Fig. 5.

Fig. 7 is a cross-section substantially on the line 7—7 of Fig. 5, and

Fig. 8 is a cross-section substantially on the line 8—8 of Fig. 4.

Referring now to Figs 1 through 3, a vehicle 10, such as a tank, has a frame structure 11 on which are supported a transmission mechanism 12 and suitable traction means 13, such as the tank track illustrated. The transmission mechanism includes the transmission 14, the axle housing 15, the drive mechanism 16, and the axle 17, all of which are suitably supported by brackets 18 carried by the vehicle 10. The traction means 13 is also supported by the frame structure 11 by means of the axle 17. In the case illustrated, where a track is the traction means, additional bogey wheels (not shown) also support the tract on the frame structure.

The transmission 14 is driven by a gas turbine 25, which is supplied with gas pressure from a gas pressure producer source preferably comprising one or more free piston engines 26. The gas pressure produced by these engines 26 is led from the outlets 27 through ducts 28 which are suitably interconnected as at 29 and 30. The gas enters a reheater 31, in which additional fuel is injected and the fuel is burned, thereby increasing the energy and volume of the gases available for use in the gas turbine 25. After being utilized to operate the gas turbine 25, the gas is exhausted through exhaust 32, and passes through vents 33 suitably located in the vehicle frame structure 11.

Each free piston engine 26 has air induction means 34, represented by inlet ports 35. Usually there will be two such air induction means 34 disposed annularly in medial portions of the substantially cylindrical free piston engines 26 (see Figs. 1 and 2). An air intake manifold structure 40 is supported by the vehicle frame structure 11 by means of brackets 41 or any suitable supporting means. The air intake manifold structure 40 comprises shroud members 42 clamped or otherwise secured together as at 43 and around the free piston engines 26, thereby adapted to enclose the air induction means 34.

By this simplified device, the air intake manifold structure 40 is enabled to act as the supporting means for the engines 26. One of the manifold shroud portions includes the air intake 45 of the air intake manifold. A suitable air cleaner or filter 46 is disposed in the air intake 45. Thus an efficient air cleaner and manifold system is integrated with the air induction system of the engine, saving a great deal of space and doing away entirely with ducts and separate air cleaner devices. In Figs. 4 through 8 is illustrated a somewhat different arrangement, wherein the free piston engines are disposed substantially parallel to the transmission and in juxtaposition thereto. The components of the assembly and their operable relation to each other are substantially the same as described in connection with Figs. 1 to 3 inclusive, except that the air intake manifold structure 40 is also preferably adapted to support the reheater 31 and is more readily adapted for support by the transmission 14. This amounts to essentially the same thing as being indirectly supported by the frame structure, rather than being directly supported as illustrated in Figs. 1 through 3, in which the engines are disposed in planes normal to the axis of the transmission and preferably remotely located with respect to the transmission. In operation, air is drawn through the air cleaner 46 directly into the air induction systems 34 of the engines.

Although I have described but a few preferred embodiments of this novel construction, it will be apparent to one skilled in the art to which the invention pertains that various changes and modifications may be made therein without departing from the spirit of the invention or the scope of the appended claims.

I claim:

1. In a vehicle having a frame structure, an engine air intake manifold structure carried by said frame structure, said manifold structure comprising a pair of spaced apart parallel side walls, a peripheral wall connecting said side walls and having an air intake opening, an air filter disposed in said opening, said parallel side walls having coaxial mounting holes inwardly spaced from said peripheral wall a free piston engine structure removably supported in the mounting holes of said manifold structure and comprising a generally cylindrical casing extending axially through said holes, said cylindrical casing having annularly spaced air inlet openings arranged to be disposed intermediate said manifold structure side walls and substantially in planes extending normal to the axis of said engine structure, said air inlet openings being radially inwardly spaced from the peripheral wall of said manifold structure to provide for free circulation of air within said manifold structure from said intake opening to said inlet opening.

2. In a vehicle having a frame structure, an engine air intake manifold structure mounted directly on and supported solely by said frame structure, said manifold structure comprising a pair of spaced apart parallel side walls, a peripheral wall connecting said side walls and having an air intake oepning, an air filter disposed in said opening, said parallel side walls having coaxial mounting holes, inwardly spaced from said peripheral wall, a free piston engine structure removably supported in the mounting holes of said manifold structure and comprising a generally cylindrical casing extending axially through said holes, said cylindrical casing having annularly spaced air inlet openings arranged to be disposed intermediate said manifold structure side walls and substantially in planes extending normal to the axis of said engine structure, said air inlet opening being radially inwardly spaced from the peripheral wall of said manifold structure to provide for free circulation of air within said manifold structure from said intake opening to said inlet openings.

3. In a vehicle having a frame structure, a plurality of engine air intake manifold structures carried by said frame structure, each manifold structure comprising a pair of spaced apart parallel side walls and a peripheral wall connecting said side walls, said parallel side walls having coaxial mounting holes inwardly spaced from said peripheral wall said manifold structures being spaced apart and parallel one with the other with said mounting holes on a common axis, a free piston engine structure removably supported in the mounting holes of said manifold structures and comprising a generally cylindrical casing extending axially through said holes, said cylindrical casing having axially spaced air inlet means arranged respectively to be disposed intermediate the side walls of said manifold structures, each air inlet means comprising annularly spaced air inlet openings, the peripheral wall of each manifold structure having an air inlet opening, and an air filter structure extending between and common to said peripheral wall air inlet openings, said air filter structure having an air intake the air inlet openings of said casing air inlet means being disposed substantially in planes extending normal to the axis of said engine structure and being radially inwardly spaced from the peripheral walls of said manifold structures to provide for free circulation of air within said manifold structures from said peripheral wall air inlet openings to said air inlet openings of said air inlet means.

4. The invention as defined in claim 1 and in which said manifold structure side walls and peripheral wall are divided along a plane containing the axis of said holes to provide two mating manifold sections, means clamping the sections together to retain said free piston engine in said holes, said peripheral wall air intake opening being disposed only in one of said sections, the other of said sections being disposed intermediate the first section and said vehicle frame structure.

5. In a vehicle having a frame structure, a transmission assembly supported by said frame structure, an engine air intake manifold structure carried solely by said transmission assembly, said manifold structure comprising a pair of spaced apart parallel side walls, a peripheral wall connecting said side walls and having an air intake opening, an air filter disposed in said opening, said parallel side walls having coaxial mounting holes inwardly spaced from said peripheral wall, a free piston engine structure removably supported in the mounting holes of said manifold structure and comprising a generally cylindrical casing extending axially through said holes, said cylindrical casing having annularly spaced air inlet openings arranged to be disposed intermediate said manifold structure side walls and substantially in planes extending normal to the axis of said engine structure, said air inlet openings being radially inwardly spaced from the peripheral wall of said manifold structure to provide for free circulation of air within said manifold structure from said intake opening to said inlet openings.

6. The invention as defined in claim 5 and including a gas turbine supported by said transmission assembly, means conducting gas under pressure from said free piston engine to said gas turbine, a reheater structure carried by said manifold structure and disposed in said gas conducting means and adapted to further pressurize gas conducted therethrough.

7. The invention as defined in claim 6 and in which said manifold structure side walls each have a second mounting hole and in which said reheater structure comprises a generally cylindrical casing removably supported in said second holes and extending axially therethrough, said reheater casing having air inlet ports disposed intermediate said manifold structure side walls and inwardly spaced from said peripheral wall.

References Cited in the file of this patent

UNITED STATES PATENTS

| 1,226,789 | Macomber | May 22, 1917 |
|---|---|---|
| 2,248,544 | Maruhn | July 8, 1941 |
| 2,471,428 | Hall | May 31, 1949 |
| 2,501,053 | Hooker | Mar. 21, 1950 |
| 2,578,162 | Wallace | Dec. 11, 1951 |
| 2,695,497 | Huber | Nov. 30, 1954 |
| 2,727,602 | Saives | Dec. 20, 1955 |

FOREIGN PATENTS

| 595,627 | Great Britain | Dec. 11, 1947 |